United States Patent Office 3,407,088
Patented Oct. 22, 1968

3,407,088
IMPREGNATION OF CELLULOSIC MATERIALS WITH MONOMERIC VINYL CHLORIDE WITH OR WITHOUT A DYE AND IN SITU POLYMERISATION BY IRRADIATION
Arthur M. Feibush and Henry P. Kieltyka, Westfield, N.J., assignors to the United States of America as represented by the United States Atomic Energy Commission
No Drawing. Filed Aug. 24, 1964, Ser. No. 391,810
4 Claims. (Cl. 117—93.31)

ABSTRACT OF THE DISCLOSURE

A process for increasing the tensile strength of wood bodies comprising the steps of subjecting the wood body to a vacuum, impregnating the wood body with monomeric vinyl chloride and irradiation polymerization of the vinyl chloride within the wood body.

This invention relates to the treatment of wood and other lignocellulose-containing bodies and more particularly to a new and useful method for increasing the strength and hardness and otherwise improving the properties of wood and wood-like-products, including a method for imparting color to such bodies.

It is well known that structural bodies made up entirely or predominantly of cellulose fibers, such as wood, have predetermined but limited strength and hardness, which varies with the species or form of the materials. It is also known that the coloring of wood has heretofore been to a large extent a surface phenomenon, and the finishing of wood normally requires extensive processing, including painting, and varnishing, of the wood.

For many purposes it is advantageous to use wood and like cellulosic bodies, but in numerous cases such materials cannot be used because of their susceptibility to mechanical injury. In other cases it is desirable to impart color to wood, but the use of paints or other surface coatings cannot be tolerated in certain cases, nor can extensive processing. Furthermore, existing coating materials must be reapplied periodically.

It is, therefore, an object of this invention to provide a new and novel method for increasing the strength, hardness and other properties of wood and other lignocellulosic materials.

A further object is to provide a method for coloring wood and the like without requiring the use of a surface coating.

A still further object is to provide wood or other cellulosic structures which have increased strength and hardness in comparison with like conventional structures and which may also be effectively colored while having surfaces free from pigment-containing coatings.

It is a feature of the invention that ordinary wood can be materially improved with respect to strength, hardness and other physical characteristics so that it can be used for purposes for which the original wood would be suitable or less desirable.

It is a further feature of the invention that wood can be colored not only at its surface but throughout its body.

Other objects and features of the invention will be readily apparent from the following detailed description, which includes specific illustrative embodiments of the invention.

In accordance with the present invention, it has been found that a substantial increase in the physical characteristics of wood or other ligocellulosic body can be brought about by the treatment of the body with monomeric vinyl chloride and irradiating the so treated wood under such conditions that a significant proportion of the treating compound is polymerized in the wood. The resulting wood product, containing from 1 to 200 percent, or more, by weight, of the vinyl chloride in the form of a polymeric product associated with the wood, is found to have improved physical properties, such as materially increased hardness, when compared with the untreated wood. Although the amount of compound desirable in the wood structure will vary with the intended use of the treated material, the presence of 1 to 75 percent by weight of the vinyl chloride is considered preferable for most purposes.

When it is desired to impart color to the wood product, a dye or other coloring agent, which is soluble in vinyl chloride, is suitably incorporated in the vinyl chloride monomer with which the wood is treated.

By employing the treatment of the present invention, the physical properties, including strength and hardness, of wood can be favorably improved. In carrying out this process, the vinyl chloride is effectively introduced into the wood without need of a solvent. The polymerization of the vinyl chloride in the wood by the subsequent irradiation brings about an increase in the strength and hardness of the wood of from about 5 to 75 percent or more. The percent increase in strength or hardness depends in part on the weight of the vinyl chloride retained by the wood. The process of the present invention is fully applicable to commercial wood treatments where relatively large cross-sectional areas are involved.

In accordance with this invention, wood or other cellulosic bodies are placed in a suitable container, e.g. a pressure vessel which can be evacuated to create a vacuum in it. The magnitude of the vacuum can vary, but for best results a pressure of the order of 1 to $3 \times 10^{-3}$ cm. mercury is employed. The vacuum is applied for at least 10 min., preferably 10 to 60 min. Longer periods of exposure to vacuum are, of course, possible, but are generally unnecessary. Vinyl chloride is then introduced as a liquid into the treating vessel in an amount sufficient to form a pool in which the body or bodies being treated are wholly immersed. The immersion or impregnation step can be conducted at atmosphereic pressure or at super-atmospheric pressure, and at room temperature or slightly elevated temperatures such that the vinyl chloride is maintained in the liquid state. Typical temperatures employed are those ranging from −15 to 30° C. Such temperatures give good results.

The preferred conditions for treatment will depend on the particular wood or wood product, the dimensions thereof, the type and degree of irradiation, and, in some instances, other factors. After an immersion period in the vinyl chloride which may vary widely, e.g. from 1 to 60 minutes or more, depending upon the type of wood and the extent and amount of impregnation desired, the free vinyl chloride is drained from the treating vessel. The impregnated cellulosic body is then exposed to ionizing radiation for a suitable period of time to bring about polymerization providing a bonding or other association between the vinyl chloride and the cellulosic material.

In selecting a suitable radiation source, high-energy particulate radiation or high-energy electromagnetic radiation is suitably employed. Thus, there may be employed atomic particles, neutrons, photon, gamma rays, X-rays, electrons, deutrons, and fission fragments from nuclear reactors or accelerators, or from artificial or natural radioactive isotopes. The selection of the radiation source will be governed by the dimensions of the body being treated. Good results have been obtained by irradiation from sources emitting from 1.6 to 10 rads/sec. such a a cobalt-60 source at dose rates up to 36,000 rads/hr. although higher dose rates can be used effectively. Wood or wood products may be irradiated up to a dose of 6 megarads. Irradiation at doses greater than 10 megarads may cause degradation of the cellulosic structure or of the polymer.

After the irradiation step, the treated cellulosic body is ready for use and can be subjected to any of the conventional wood working operations, e.g. cutting, planing, drilling, sanding, and the like. The treated wood can be worked more easily than ordinary wood and does not require finishing agents. A satin smooth surface is easily obtained by sanding. Removal of a surface layer does not alter the properties of the wood because the polymer is uniformly distributed in the wood.

As previously mentioned, one of the features of the invention is the possibility of coloring the wood without the use of coatings. This is effected by dissolving in the vinyl chloride charged to the treating vessel a dye or pigment of the desired color which is also soluble in vinyl chloride. It will be apparent to those skilled in the art that there are a wide variety of dyes and pigments which can be employed, and the specific coloring agent employed, as long as it is soluble in vinyl chloride, forms no part of the invention. Typical coloring agents include Sudan Red III (C.I. 26100), Malachite Green (C.I. 42000), phenacyl yellow S, Aniline violet, and like vinyl-chloride-soluble dyes and pigments.

In a typical procedure for treating wood to increase its strength and hardness, an air-dried block of Douglas Fir, for example, is impregnated with vinyl chloride by first subjecting it to a vacuum of 1 to $3 \times 10^{-3}$ cm. of mercury and then immersing it in vinyl chloride at an appropriate temperature and pressure. Subsequently, the block, without removal from the treating vessel, but after removal of excess vinyl chloride, is irradiated to from 0.50 to 6 megarads by, for example, a cobalt-60 source at a dose rate of about 36,000 rads per hour. Following the irradiation, the wood is removed from the treating vessel.

For purposes of comparison and to determine the increase in strength and hardness, the treated wood pieces are subjected to standard tests, such as ASTM compressive strength test (D695–61T), Shore hardness test (D1706–61), abrasion (D–1044–56) and the like, and the results are compared with the results obtained by using the same tests on control samples of the untreated wood.

The following specific examples of practical application are illustrative of the present invention but are not to be interpreted as limiting the same in any way:

Example I

Lengths of redwood ¾ inch by 1 inch in cross section, and 5 inches long, were weighed and placed in a vessel slightly larger than the wood samples. After connection to a vacuum pumping system, the pressure in the vessel was decreased to 10 microns of mercury. One pound of liquid vinyl chloride was introduced into the container and the container was agitated for one half hour. Excess vinyl chloride was drained. The container was then exposed to the radiation from a cobalt-60 source. The dose rate was 32,000 rads per hour. Exposure required to obtain polymerization was 1.7 megarads. After removal from the radiation source, the container was opened. Any excess polyvinyl chloride on the outside of the wood was removed, and the wood was ready for use as desired without any further treatment. The product, now having polyvinyl chloride throughout, was reweighed and it was determined that it had gained 90% in weight.

When the thus-produced, treated product was compared with a sample of untreated wood for compressive yield strength, Shore durometer hardness, and Tabor abrasion, the following results were obtained:

| Compressive yield strength parallel to grain: | p.s.i. |
|---|---|
| Untreated | 6,000 |
| Treated | 8,500 |

| Shore durometer hardness: | |
|---|---|
| Untreated | |
| End Grain | 40 |
| Longitudinal | 53 |
| Quarter Sawn | 45 |
| Treated | |
| End Grain | 58 |
| Longitudinal | 80 |
| Quarter Sawn | 65 |

| Tabor abrasion: | Percent volume loss-fine abrasive |
|---|---|
| Untreated | 1.162 |
| Treated | 0.438 |

Example II

When it is desired to obtain a colored product, a dye or pigment of the appropriate color and soluble in vinyl chloride is added to the treatment vessel before introduction of the vinyl chloride or is previously dissolved in the vinyl chloride. In a typical operation, such as described in Example I, one-tenth of a gram of Sudan Red III (Solvent Red No. 23, Color Index 26100) is used with one pound of liquid vinyl chloride. In that case, the treated product becomes colored red throughout.

Examples III et seq.

Corresponding results are obtained when the redwood of Example I is replaced by white fir, birch, mahogany, ash, teak and poplar.

Similarly, other coloring agents soluble in vinyl chloride e.g. malachite green, phenacyl yellow S, and aniline violet, give correspondingly colored products i.e. green, yellow, and blue products, respectively.

We claim:
1. A process for increasing the tensile strength and hardness of otherwise untreated wood bodies which comprises the steps of:
 (a) reducing the atmospheric pressure on the wood body to a pressure of less than $1 \times 10^{-3}$ cm. of mercury;
 (b) impregnating the body with a composition consisting of monomeric vinyl chloride; and
 (c) irradiating the so treated body with from $6 \times 10^3$ to $10^4$ rads of high energy radiation at rates ranging from about 1.6 to about 10 rads per second.

2. The process of claim 1 wherein the body is subjected to an atmospheric pressure of less than $1 \times 10^{-3}$ cm. of mercury for 60 minutes.

3. A process for increasing the tensile strength and hardness of otherwise untreated lignocellulosic bodies which comprises the steps of:
 (a) reducing the atmospheric pressure on the lignocellulosic body to a pressure of less than $1 \times 10^{-3}$ cm. of mercury;
 (b) impregnating the body with a composition consisting of monomeric vinyl chloride and a dye; and
 (c) irradiating the so treated body with from $6 \times 10^3$ to $10^4$ rads of high energy radiation at rates ranging from about 1.6 to about 10 rads per hour.

4. The process of claim 3 wherein the temperature of the vinyl chloride is maintained at a temperature ranging from about −15° C. to about 30° C. during said impregnation.

References Cited

UNITED STATES PATENTS

| | | | |
|---|---|---|---|
| 2,867,543 | 1/1959 | Braun | 117—148 |
| 2,936,248 | 5/1960 | Marciniak | 117—148 |
| 3,006,830 | 10/1961 | Cloninger et al. | 117—93.31 |
| 3,029,159 | 4/1962 | Bliven et al. | 117—61 |
| 3,077,417 | 2/1963 | Kenaga | 117—148 |
| 3,077,418 | 2/1963 | Kenega | 117—148 |
| 3,077,419 | 2/1963 | Kenega | 117—148 |
| 3,077,420 | 2/1963 | Kenega | 117—148 |
| 3,252,935 | 5/1966 | Thompson et al. | 117—93.31 |
| 2,922,768 | 1/1960 | Mino et al. | 117—93.31 |

FOREIGN PATENTS 500,223  2/1939  Great Britain.

ALFRED L. LEAVITT, *Primary Examiner.*

J. H. NEWSOME, *Assistant Examiner.*